United States Patent [19]

Stuart et al.

[11] 3,883,727

[45] May 13, 1975

[54] MULTILEVEL DIGITAL FILTER

[76] Inventors: Richard L. Stuart; Arvind M. Bhopale, both of Belts, Md.

[22] Filed: July 5, 1972

[21] Appl. No.: 269,048

[52] U.S. Cl. .................................... 235/152; 333/28

[51] Int. Cl. .......................... G06f 1/02; G06f 15/34

[58] Field of Search .................... 235/152, 156, 164; 328/162, 163; 333/28; 325/41, 42

[56] References Cited

UNITED STATES PATENTS

| | | | |
|---|---|---|---|
| 3,629,509 | 12/1971 | Glaser | 235/152 X |
| 3,651,316 | 3/1972 | Gibson | 235/152 |
| 3,665,171 | 5/1972 | Morrow | 235/152 |
| 3,699,321 | 10/1972 | Gibson | 235/152 |

*Primary Examiner*—Malcolm A. Morrison
*Assistant Examiner*—James F. Gottman
*Attorney, Agent, or Firm*—Larson, Taylor, & Hinds

[57] ABSTRACT

A multi-level digital filter system applicable to modems is provided. The incoming data is read serially into M shift registers and read out in parallel by M further shift registers under the control of an M-bit clock, where $M=\log_2 N$ and N is the number of levels. After appropriate conditioning by a logic control circuit, the parallel outputs are filtered separately by M digital shaping filters. The shaping filters each comprise a chain of shift registers the outputs of which are weighted by a resistor network and summed to produce a desired time response, which in an exemplary embodiment is the inverse Fourier transform of an ideal low-pass filter. Summing of the filter outputs produces an N-level signal.

5 Claims, 8 Drawing Figures

| Y1 | SIGN BIT Y2 | AMPLITUDE BIT $E_2=Y1 \oplus Y2$ | LEVEL AT $+E1=-Y2$ | LEVEL AT $E'2=(-E2+1.5)$ | LEVEL AT $E_0=-(2E1+E'2)$ |
|---|---|---|---|---|---|
| 0 | 0 | 0 | 0 | +1.5 | −1.5 |
| 0 | 1 | 1 | −1 | +0.5 | +1.5 |
| 1 | 0 | 1 | 0 | +0.5 | −0.5 |
| 1 | 1 | 0 | −1 | +1.5 | +0.5 |

MULTILEVEL DIGITAL FILTER

FIELD OF THE INVENTION

The present invention relates to digital filters for data modems and the like, and more particularly, to digital filter systems for generating multilevel bandlimited signals.

BACKGROUND OF THE INVENTION

Single sideband and double sideband transmitters for data modems characteristically include a plurality of filters as well as other shaping and delay networks. For example, many conventional modems utilize a shaping filter, a vestigal sideband filter and a phase equalizer in the data transmitter. These circuits are expensive and relatively difficult to control insofar as producing a precise time response is concerned. Hence, given the increase emphasis on the reduction in the hardward required in data communication systems, any system which eliminates such circuits has obvious advantages as compared with the systems of the prior art.

SUMMARY OF THE INVENTION

In accordance with the present invention a multilevel digital filter system is provided which is applicable to data modems and which can be used in a single sideband or double sideband transmitter. The filter system can be used to eliminate the necessity of a shaping filter, VSB filter and phase equalizer, the filter providing a fixed delay and having no intersymbol interference at sampling points. The invention also involves techniques of generating band limited waveforms and enables the synthesizing of a preselected controlled time response.

According to a presently preferred embodiment of the invention, means are provided whereby the incoming data is read serially into clock-controlled shift registers and is read out in parallel using an M-bit clock, where M-$Log_2$N and N is the number of levels. Logic controls convert the parallel outputs into a desired form and the resultant output bits are filtered separately by M, two-level input digital filters. It is noted that if M is a fraction it is rounded to the next higher integer so that the number of possible levels is greater than desired, the logic control being designed so that only the desired levels are generated. The digital filters comprise an $n$-stage shift register having a common clock. The number of shift registers, $n$, is given by the expression $n=r(m-1)+2$, where $r$ is the ratio of the clock rate to the data rate an $m$ is the equivalent number of pulses which can be accomodated with the period of the shaping function. The output of each shift-register is weighted by a resistor network and summed to produce a desired time response. In a specific embodiment this desired time response is the inverse Fourier transform of an ideal low-pass filter, the filter serving to delay, symmetrically truncate and shape the time response such that the frequency response produced is that of an ideal low-pass filter within specified error limits. The window function, $K_0 - K_1 \cos([\pi/T_1]\cdot t)$, is used for shaping a truncated $\sin x/x$ waveform, where $K_0$ and $K_1$ are constants having optimum values of 0.538 and 0.462, respectively. The outputs of the filters, after suitable smoothing, are summed to produce the N-level filtered analog signal.

The digital filter system of the invention can adapt to a change of data rate as long as the ratio of the data rate to filter clocking frequency is held constant.

Other features and advantages of the invention will be set forth in or apparent from a detailed description of a preferred embodiment found hereinbelow.

DESCRIPTION OF THE PREFERRED EMBODIMENTS

As mentioned hereinabove, the present invention is applicable to N-level systems and, in fact, a generalized N-level system is considered hereinabove. However, it is thought that the present invention can be perhaps best understood by considering a concrete example before considering the generalized N-level system. Hence, a four-level system shown in FIG. 1 will be investigated first.

Figures 1, 2:
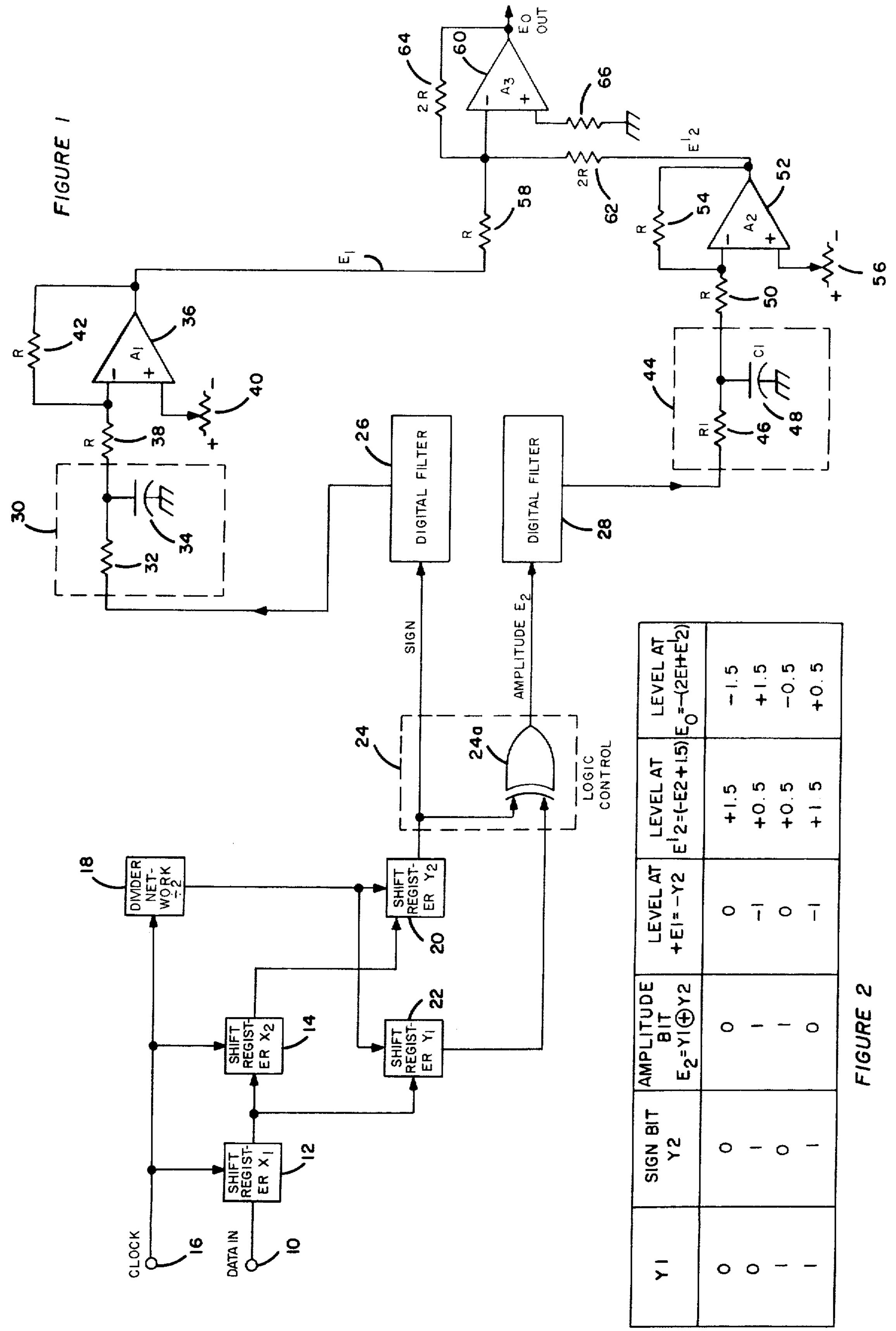
FIG. 1 is a schematic circuit diagram, largely in block form, of a four level digital filter system in accordance with one embodiment of the invention.
FIG. 2 is a table indicating the values at various points in the circuit of FIG. 1.

Referring to FIG. 1, a data input indicated at 10 is read serially into first and second shift registers 12 and 14, the output of register 12 forming an input of register 14. The clock inputs of registers 12 and 14 are connected to a clock, indicated at 16, which is divided in a divider network 18 to produce a dibit clock. The outputs of registers 12 and 14 are connected to registers 22 and 20, respectively. The clock inputs of registers 20 and 22 are connected to the output of divider network 18 so that the data input is read out in parallel under the control of the dibit clock.

One parallel output bit is used to control the sign of the resulting waveform whereas the other parallel output bit is used to control the amplitude. The output of register 20 corresponds to the sign bit in the example under consideration whereas the amplitude bit is derived in a manner described hereinafter. As illustrated, shift registers 20 and 22 are connected to a logic control network 24 indicated in dashed lines. As mentioned above and as shown in FIG. 1, the output of register 20 forms a first, sign bit output of the logic control network 24. Network 24 includes an exclusive OR gate 24a which performs a Modulo-2 addition of the outputs of registers 20 and 22 to generate the second, amplitude bit output. The rules for Modulo-2 addition are familiar to those skilled in the art and the truth table of FIG. 2 illustrates the relationship between the second, amplitude bit output, denoted E2, and the outputs of registers 20 and 22. The two outputs of logic network 24 are respectively connected to first and second digital filters 26 and 28 described hereinbelow.

The levels "0" and "1" at the input of first or sign bit digital filter 26 are equivalent to logical 0's and 1's respectively. As explained hereinbelow, digital filter 26 is used to produce a step approximation of the desired time response. In the specific application under consideration this response is the inverse Fourier transform of an ideal low-pass filter. The step output of sign bit digital filter 26 smoothed by a smoothing circuit 30 formed by a series resistor 32 and a shunt capacitor 34, and is buffered by an operational amplifier 36. The inverting input of amplifier 36 is connected to the output of smoothing circuit 30 through an input resistor 38 whereas the non-inverting input is connected to the tap of potentiometer 40 to provide a predetermined reference voltage. A feedback resistor 42, of a value equal to that of input resistor 38, is connected between the output of amplifier 36 and the inverting input thereof. The output of operational amplifier 36 is denoted E1 in FIG. 1 and, as is shown in the truth table of FIG. 2, is equal to minus the output voltage of the digital filter 26.

Digital filter 28 is similar to digital filter 26 and produces a step output which is an approximation of the desired time response and which is processed by a smoothing filter 44 formed by a series resistor 46 and a shunt capacitor 48. The smoothed analog output of filter 44 is connected through an input resistor 50 to the inverting input of an operational amplifier 52. An equal-valued feedback resistor 54 is connected between the output of amplifier 52 and the inverting input thereof as shown, the non-inverting input of amplifier 52 being connected to a further potentiometer 56. The output of amplifier 52 is denoted E'2 as is indicated in FIG. 1 and, as shown in the truth table of FIG. 2, is equal to minus the output voltage of the digital filter 28, plus a fixed 1.5 volt bias or reference voltage provided at the tap of potentiometer 56.

The output, E1, of amplifier 36 is connected through a resistor 58 to the inverting input of a operational amplifier 60 whereas the output, E'2, of amplifier 52 is connected to the same input through a second resistor 62. The value of resistor 62 is twice that of resistor 58 and equal to that of feedback resistor 64. The non-inverting input of amplifier 60 is connected to ground through a further resistor 66 and the output thereof, denoted $E_0$, is the desired multilevel signal as indicated in the table of FIG. 2.

Figure 3:
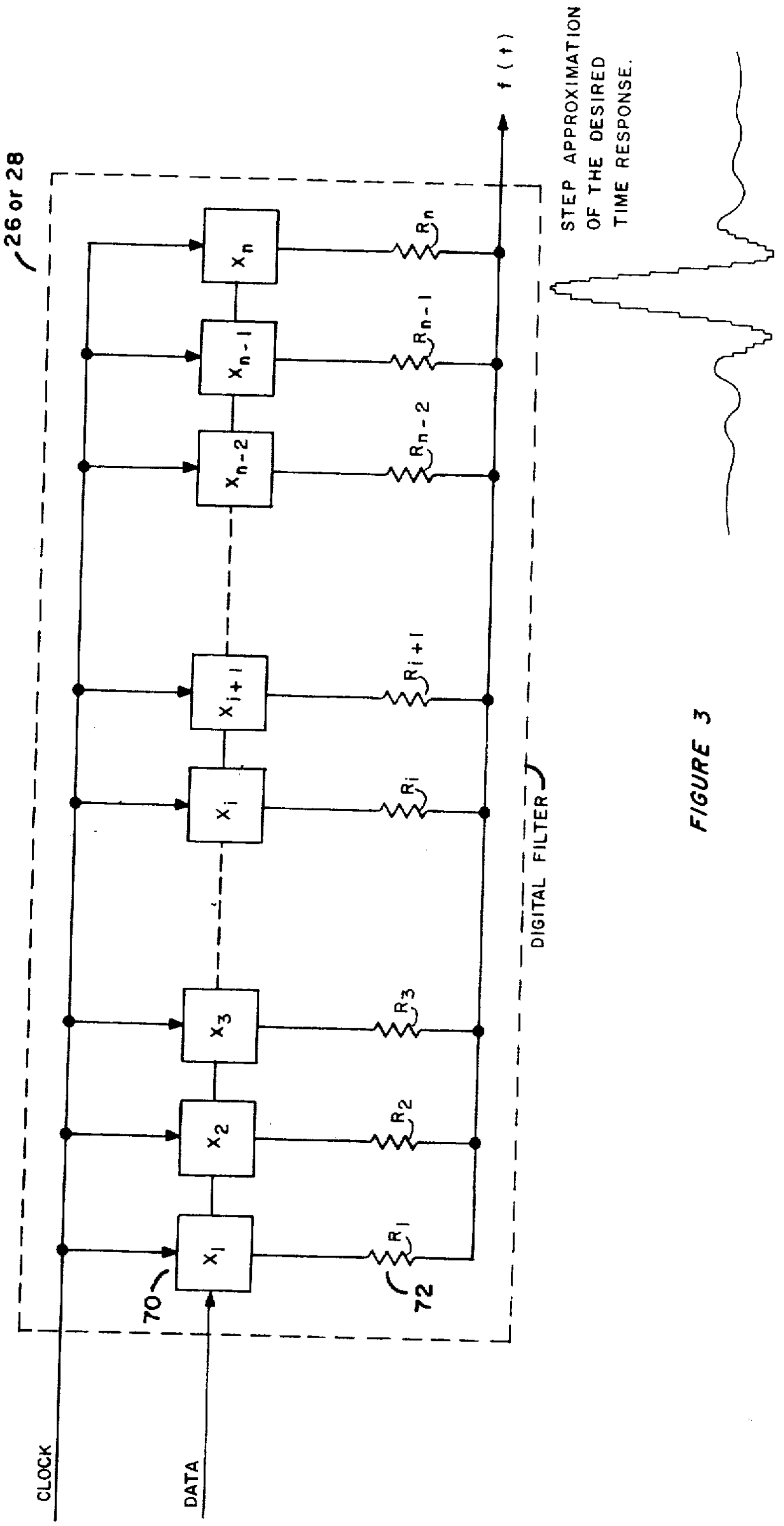
FIG. 3 is a schematic circuit diagram of the digital shaping filters of FIG. 1.

Referring to FIG. 3, the make-up of the digital filters 26 and 28 of FIG. 1 is shown. Filters 26 and 28 basically comprise a multi-stage shift register, generally denoted 70, the shift-registers of the individual stages having a common clock as indicated. FIG. 3 shows a generalized, exemplary $n$-stage shift-register made up of individual registers X1, X2, . . . X$i$, X$i$+1, . . . X$n$−2, X$n$−1, X$n$. The output of each shift-register is weighted by a corresponding register R1 and Rn which forms part of the resistor ladder network generally denoted 72, these outputs being summed together to produce a step approximateion of the desire time response. As mentioned hereinabove, in the specific application under consideration the desired time response is the inverse Fourier transform of an ideal low-pass filter. The digital filters 26 and 28 serve to delay, symmetrically truncate and shape this response such that the frequency response thereof approaches that of an ideal low-pass filter within specified error limits. The shaping or window function utilized is of the general form $K_o - K_1 \cos(\pi/T1\ t)$ where $K_o$ and K1 are constants having optimum values of 0.538 and 0.462 respectively, and the function exists for the truncated period $t=0$ to $2T_1$. The resulting waveform for a single input pulse is symmetrical about the point $t=T_1$ with equally spaced zero crossings. The spacing between two successive zero crossings is the same as the width of a single input pulse, which is the reciprocal of the input data rate. The clock rate is decided by the number of samples in a single input pulse. The ratio of the clock rate to the data rate is 8 in the present instance although this ratio can be any integer greater than 2. The number of shift registers, $n$, is given by the expression $n=r(m-1)+2$wherein $r$ is the ratio of the clock rate to data rate and $m$ is the equivalent number of pulses which can be accomodated within the period $t=0$ to $2T_1$.

Figure 8:
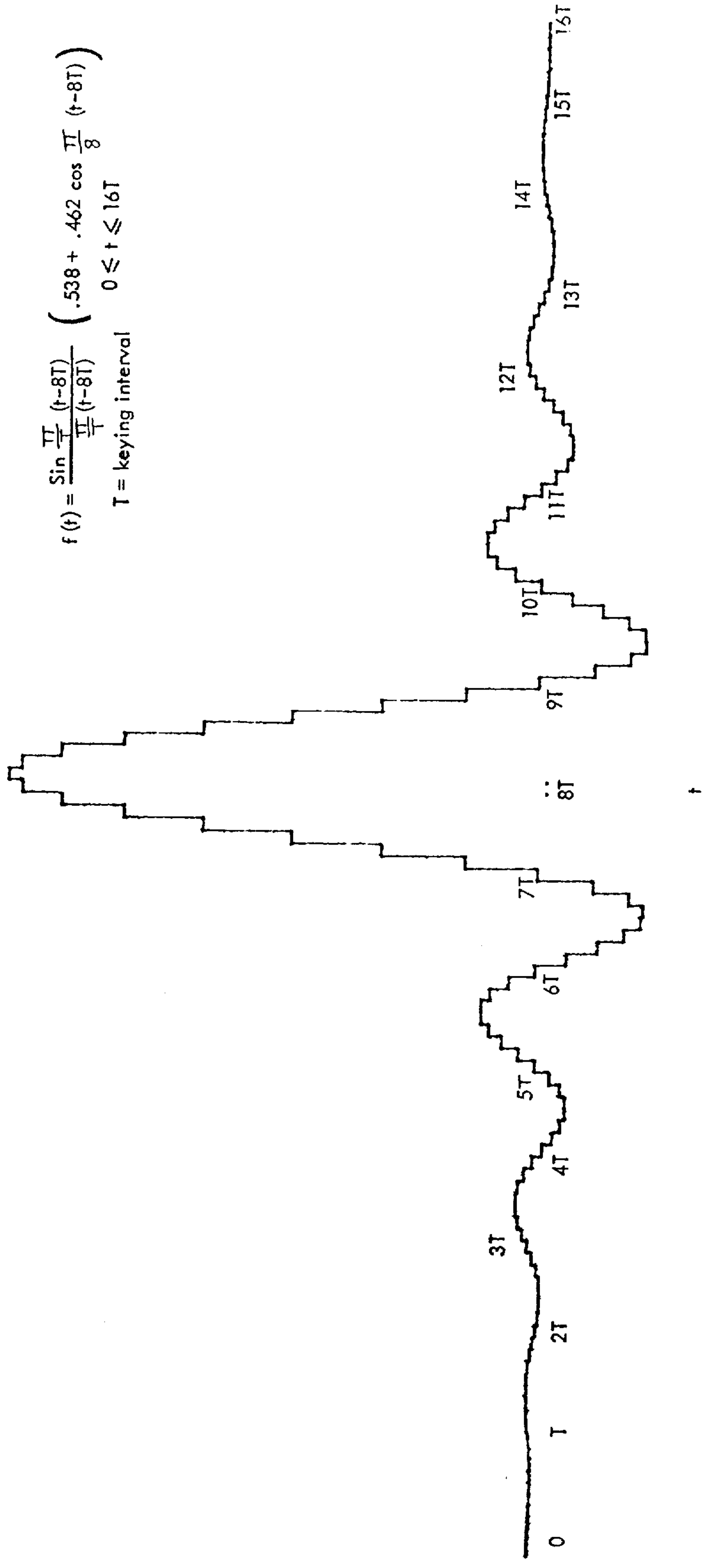
FIG. 8 is voltage-time diagram of the output of the digital filter of FIG. 3.

The values of the individual resistors $R_1$ to $R_n$ referred to above is given by the following equations:

$$C_1 = 0;$$

$$C_I + 1 = S_{I+1} - S_I \text{ for } I = 1 \text{ to } r$$

$$C_J = S_J - \sum_{I=K}^{K+r-2} C_I \text{ for } J = r+2 \text{ to } N/2+1 \text{ and } K = 3 \text{ to } \frac{N}{2} - r - 1$$

$$C_I = (C_I \pm [C_{N/2}] - J+3)/2 \text{ for } I = (N/2) - r + 2 \text{ to } [(N-r)/2] + 1 \text{ and } J = 1 \text{ to } I - (N/2) + r$$

where $S_1, S_2, S_3 \ldots S_N$ are the sampled values of the desired time response and $C_1, C_2, C_3 \ldots C_n$ are the coefficient values. The sign in the last expression is positive for even functions and negative for odd functions. The resistor values, $R_i$'s, are inversely proportional to the coefficients $C_i$ and are given by the expression $R_i = 1/C_i = \pm R(N-r-i+3)$ for $i=1$to $n/2$. The sign in this expression is positive for even functions and negative for odd functions. For N=128, $m=16$ and $r=8$ the resister values are shown in the table set forth at the end of the specification. These values produce the step approximated pulse response shown in FIG. 8.

The same technique is followed in determining the resistor values used in generating an equivalent Hilbert transform which is equally delayed, symmetrically truncated and shaped.

Figure 4:
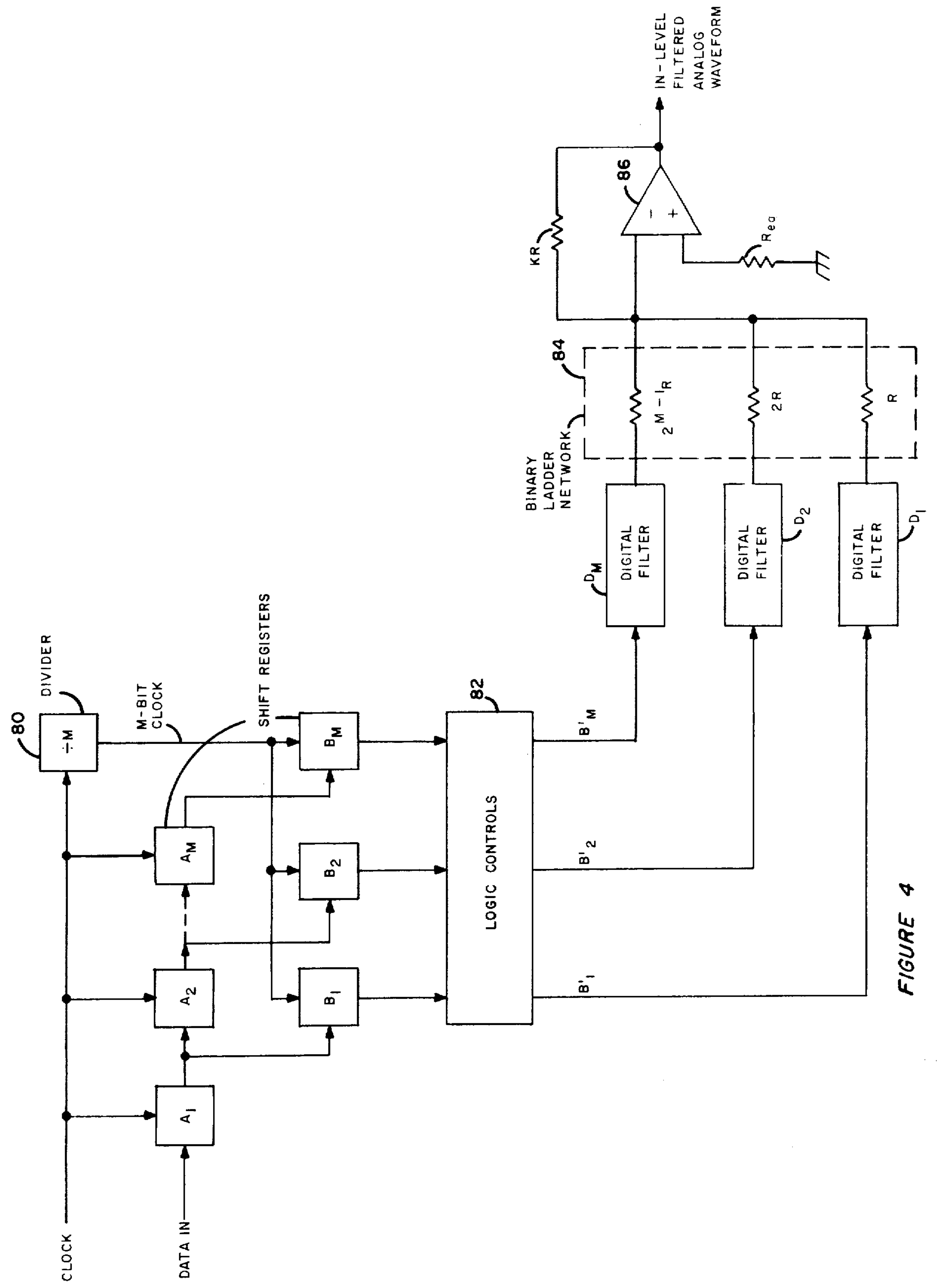
FIG. 4 is a schematic circuit diagram of an N-level digital filter system in accordance with a further embodiment of the invention.

Referring to FIG. 4, a generalized N-level digital filtering system is shown. In this system the incoming data is read serially into M shift-registers $A_1, A_2 \ldots A_M$, wherein $M=\log_2 N$ and if M is a fraction it is rounded to the next higher integer. The data read into registers $A_1$ and $A_M$ is read out in parallel by a second series of shift registers $B_1, B_2 \ldots B_M$ under the control of an M-bit clock produced by dividing the clock by M in a divider 80. A logic control circuit 82 transforms the parallel outputs of registers $B_1$ to $B_M$ into the desired parallel outputs B'1, B'2, $B'_M$ in a manner similar to that discussed hereinabove in connection with FIG. 1. The logic circuit can be as simple as straight hard wired connections between inputs and outputs of control circuit 82. The input to the logic control circuit 82 can be "gray" coded, or any other desired code can be used to modify the data. In general the maximum number of levels that can be generated by using M digital filters is $2^M$. The number of levels generated would be less than $2^M$ if some of the combinations of M bits are inhibited by the logic control circuit 82. Each output of this logic control circuit 82 is filtered by one of M, two level input digital filters $D_1$, $D_2$ . . . $D_m$ as illustrated. The outputs of filters $D_1$ to $D_M$ are weighted by a binary weighted ladder resistor network 84 and summed to form the input to a summing amplifier 86. The relationship between the resistor values is indicated in FIG. 4, and a bias term is provided by summing amplifier 86 to make the output bipolar. As shown, the summing amplifier network includes a reference or equivalent resistor Req. and a feedback resistor KR. The arrangement of ladder network 84 and the operational amplifier 86 with feedback resistor $K_R$ and equivalent resistor Req. results in different gains for the digital filter D1, D2, D3 . . . $D_M$ , namely, −K, −K/2, −K/4 . . . −K/2 (M−1), respectively. Considering a numerical example, suppose eight levels are to be generated, with the result that M = $\log_2 8$ = 3. Let the outputs of D1, D2, D3 be $e1$, $e2$, $e3$ and their values be either +1 or −1 at the sampling instants, then the output of the operation $a1$ amplifier 86, $e_o$, can be expressed as o $e_0 = -K\,(e_1 + e2/2 + e3/4)$. The 8 possible levels are shown in the following table:

| $e1$ | $e2$ | $e3$ | $-e_0=(e_1+e2/2+e3/4)$ K |
|---|---|---|---|
| 1 | 1 | 1 | +1.75K |
| 1 | 1 | −1 | +1.25K |
| 1 | −1 | 1 | + .75K |
| 1 | −1 | −1 | + .25K |
| −1 | 1 | 1 | − .25K |
| −1 | 1 | −1 | − .75K |
| −1 | −1 | 1 | −1.25K |
| −1 | −1 | −1 | −1.75K |

Thus the output of summing amplifier 86 is a N-level filtered analog signal.

Figure 5:
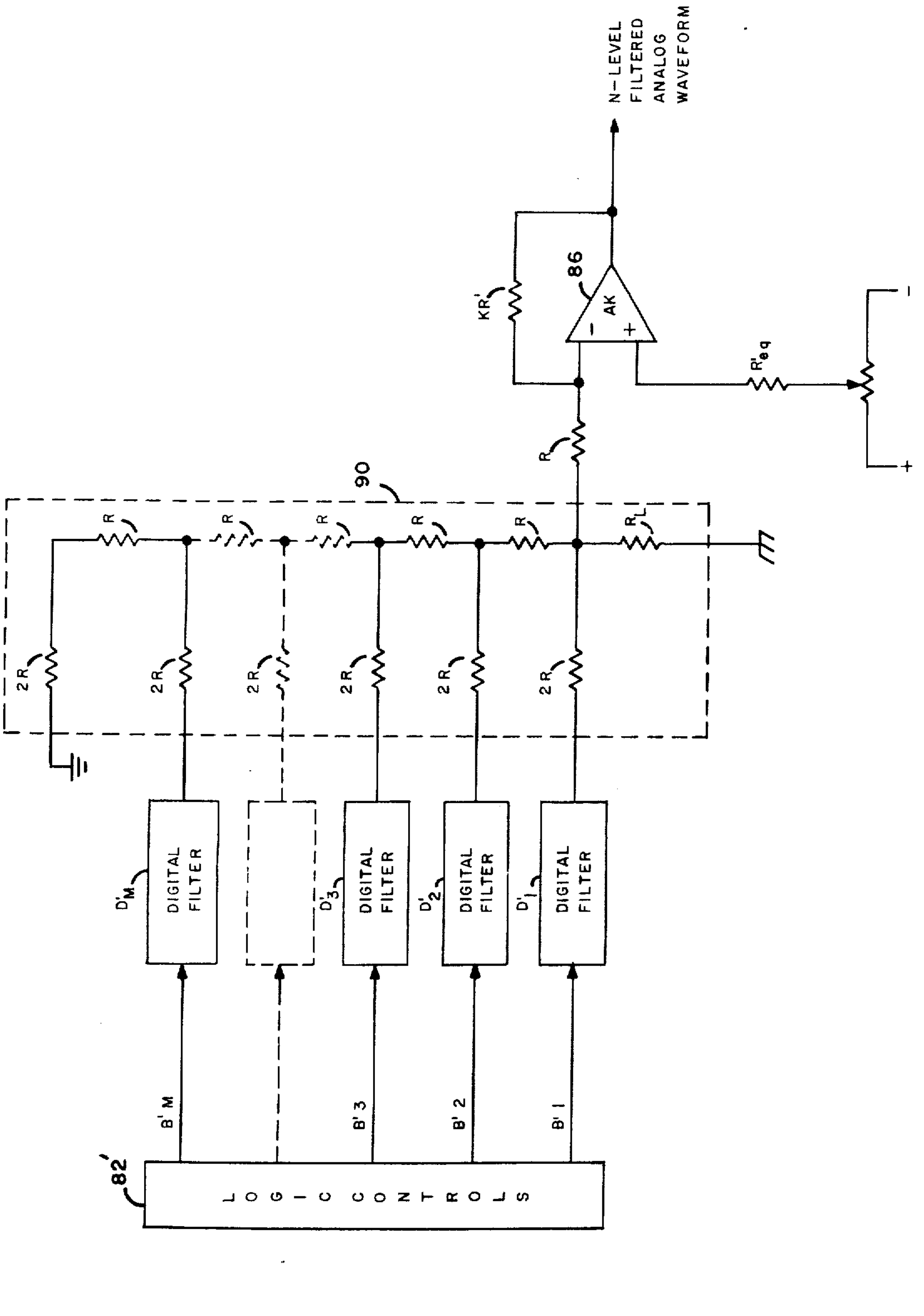
FIG. 5 is a schematic circuit diagram of an alternate embodiment of the N-level digital filter system of FIG. 4.

Referring to FIG. 5, a system similar to that of FIG. 4 is shown and like elements are given the same numbers with primes attached. The principal difference between the system of FIGS. 4 and 5 is that in the latter a conventional R−2R ladder network 90 replaces the binary ladder network of FIG. 4.

Figure 6:
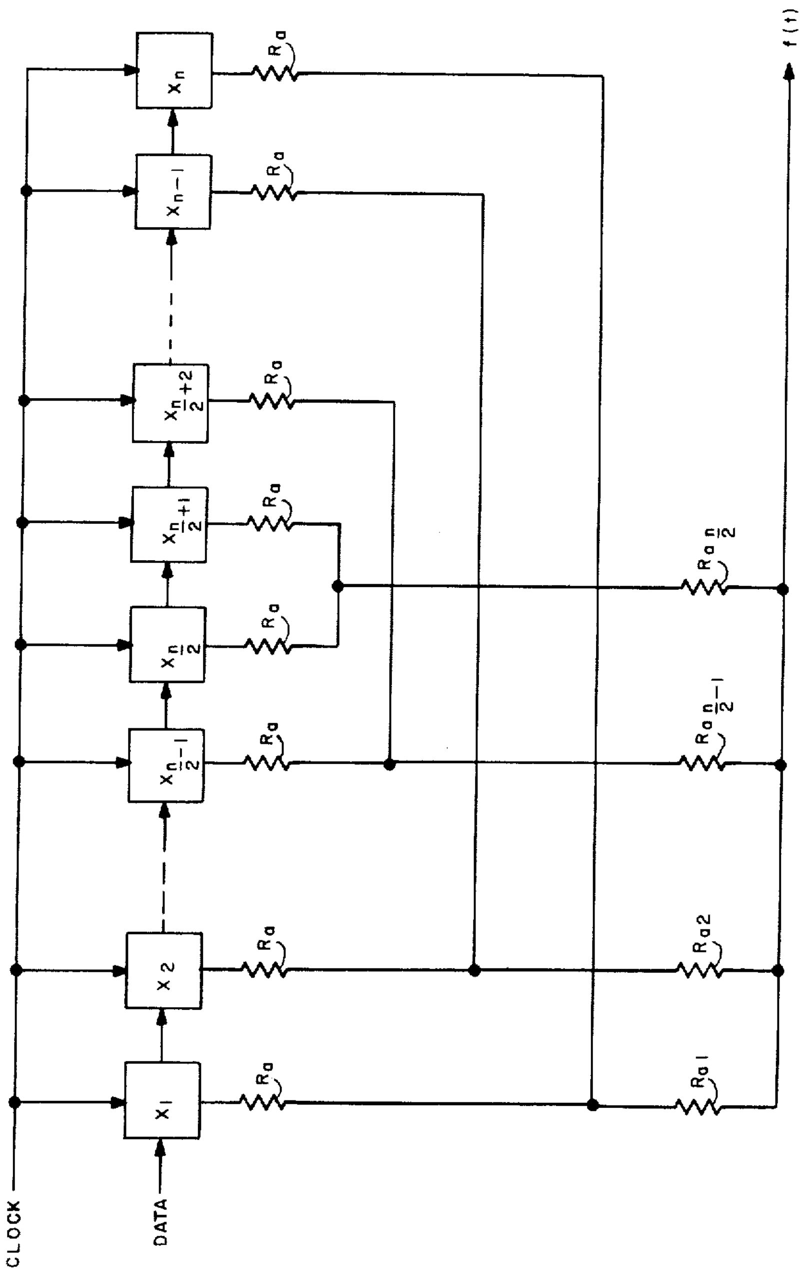
FIG. 6 is a schematic circuit diagram of an alternate embodiment of the digital shaping filter of FIG. 3.

Referring to FIG. 6, an alternate embodiment of the digital filter of FIG. 3 is shown. As illustrated, resistors $R_a$ are connected to the outputs of all of the registers $X_1$ to $X_n$ and the outputs of registers $X_1$ and $X_n$, $X_2$ and $X_{n-1}$ . . . (X$n$/2) −1 and (X$n$/2)+2, and X$n$/2 and (X$n$/2)+1 are summed. These outputs are connected through resistors R$a$1, R$a$2, . . . (R$a$n/2) −1, Ran/2 to form the desired $f(t)$ output.

Figure 7:
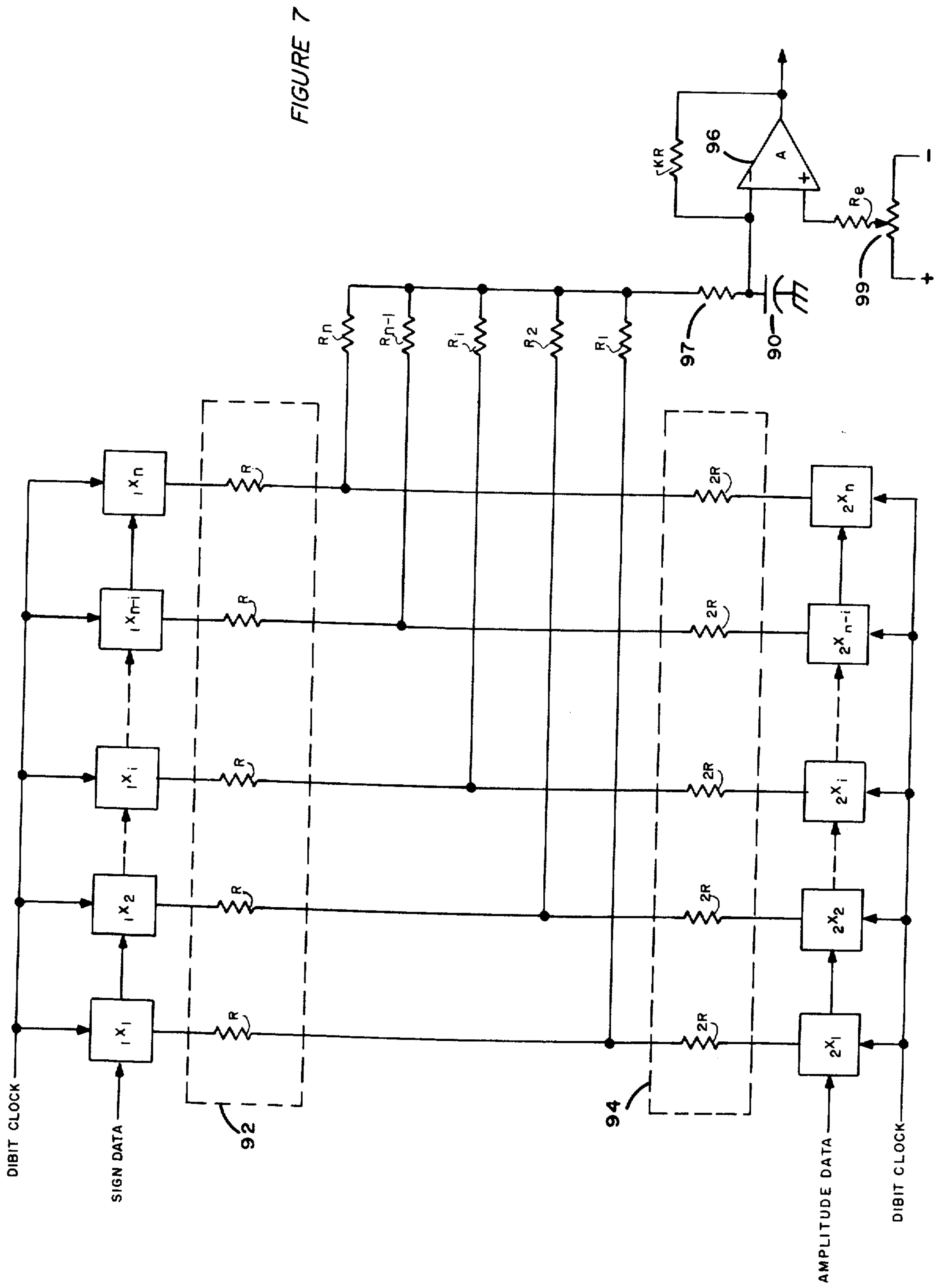
FIG. 7 is a schematic circuit diagram of alternate embodiment of four-level digital filter system of FIG. 1.

Finally, referring to FIG. 7, an alternate embodiment of the four-level digital filter arrangement of FIG. 1 is shown. The sign and amplitude data is separated as described hereinabove and a dibit clock, derived in the manner discussed above, controls the sampling times of first and second chains of registers 1 × 1 to 1 × $n$ and 2 × 1 to 2 × $n$. As illustrated, a first resistor network 92 is formed by resistors R individually connected to the outputs of registers 1 × 1 to 1 × $n$ and a second resistor network 94 is formed by resistors 2R individually connected to the outputs or registers 2 × 1 to 2 × $n$. The individual outputs of networks are summed and are respectively connected through resistors $R_1$ , $R_2$, . . . $R_i$ , . . . $R_{n-1}$, $R_n$ to a common input to an operational amplifier 96 through a resistor 97. A capacitor 90 connects the input to ground and the circuit of operational amplifier 96 includes a feedback resistor KR and a reference or biasing input formed by potentiometer 99 and resistor Req. connected between the tap of potentiometer 99 and the non-inverting input to operational amplifier 98.

Although the invention has been described with respect to exemplary embodiments thereof, it will be understood that variations and modifications can be effected in these embodiments without departing from the scope and spirit of the invention. The values for the resistors in the example referred to above where N=128, $m$=16 and $r$=8 are given in the following table:

| | Resistor values | | Resistor values |
|---|---|---|---|
| $R_1$ | open | $R_{60}$ | 10.6K |
| $R_2$ | −1224.8K | $R_{61}$ | 9.9K |
| $R_3$ | −1333.5K | $R_{62}$ | 9.9K |
| $R_4$ | −1702.0K | $R_{63}$ | 10.6K |
| $R_5$ | −3032.9K | $R_{64}$ | 12.0K |
| $R_6$ | 13298 K | $R_{65}$ | 14.7K |
| $R_7$ | 2394.5K | $R_{66}$ | 19.9K |
| $R_8$ | 1192.5K | $R_{67}$ | 32.1K |
| $R_9$ | 823.5K | $R_{68}$ | 77.3K |
| $R_{10}$ | 1529.2K | $R_{69}$ | −345.1K |
| $R_{11}$ | 1279.8K | $R_{70}$ | −65.8K |
| $R_{12}$ | 1335.5K | $R_{71}$ | −43.1K |
| $R_{13}$ | 1895.2K | $R_{72}$ | −37.4K |
| $R_{14}$ | 7836.9K | $R_{73}$ | −38.2K |
| $R_{15}$ | −2497.4K | $R_{74}$ | −47.0K |
| $R_{16}$ | −1031.6K | $R_{75}$ | −66.9K |
| $R_{17}$ | −680.7K | $R_{76}$ | −133.9K |
| $R_{18}$ | −384.3K | $R_{77}$ | −21475.6K |
| $R_{19}$ | −388.6K | $R_{78}$ | 158.4K |
| $R_{20}$ | −473.0K | $R_{79}$ | 92.0K |
| $R_{21}$ | −815.8K | $R_{80}$ | 75.6K |
| $R_{22}$ | 54882.3K | $R_{81}$ | 75.0K |
| $R_{23}$ | 680.4K | $R_{82}$ | 81.5K |
| $R_{24}$ | 342.8K | $R_{83}$ | 112.7K |
| $R_{25}$ | 243.2K | $R_{84}$ | 215.4K |
| $R_{26}$ | 250.8K | $R_{85}$ | 3462.7K |
| $R_{27}$ | 247.8K | $R_{86}$ | −281.6K |
| $R_{28}$ | 298.0K | $R_{87}$ | −156.4K |
| $R_{29}$ | 512.1K | $R_{88}$ | −125.7K |
| $R_{30}$ | −30835.6K | $R_{89}$ | −122.4K |
| $R_{31}$ | −428.9K | $R_{90}$ | −156.4K |
| $R_{32}$ | −218.2K | $R_{91}$ | −218.2K |
| $R_{33}$ | −156.6K | $R_{92}$ | −428.9K |
| $R_{34}$ | −122.4K | $R_{93}$ | −30835.6K |
| $R_{35}$ | −125.7K | $R_{94}$ | −512.1K |
| $R_{36}$ | −156.4K | $R_{95}$ | −298.0K |
| $R_{37}$ | −281.6K | $R_{96}$ | −247.8K |
| $R_{38}$ | −346.2K | $R_{97}$ | −250.8K |
| $R_{39}$ | −215.4K | $R_{98}$ | −243.2K |
| $R_{40}$ | −112.7K | $R_{99}$ | 342.8K |
| $R_{41}$ | −81.5K | $R_{100}$ | 680.4K |
| $R_{42}$ | −75.0K | $R_{101}$ | 54882.3K |
| $R_{43}$ | −75.6K | $R_{102}$ | −815.8K |
| $R_{44}$ | −92.0K | $R_{103}$ | −473.0K |
| $R_{45}$ | −158.4K | $R_{104}$ | −388.6K |
| $R_{46}$ | −21475.6K | $R_{105}$ | −384.3K |
| $R_{47}$ | −133.9K | $R_{106}$ | −680.7K |
| $R_{48}$ | −66.9K | $R_{107}$ | −1031.6K |
| $R_{49}$ | −47.0K | $R_{108}$ | −2497.4K |
| $R_{50}$ | −38.2K | $R_{109}$ | 7836.9K |
| $R_{51}$ | −37.4K | $R_{110}$ | 1895.2K |
| $R_{52}$ | −43.1K | $R_{111}$ | 1335.5K |
| $R_{53}$ | −65.8K | $R_{112}$ | 1279.8K |
| $R_{54}$ | −345.1K | $R_{113}$ | 1529.2K |
| $R_{55}$ | 77.3K | $R_{114}$ | 823.5K |
| $R_{56}$ | 32.1K | $R_{115}$ | 1192.5K |
| $R_{57}$ | 19.9K | $R_{116}$ | 2394.5K |
| $R_{58}$ | 14.7K | $R_{117}$ | 73298.1K |
| $R_{59}$ | 12.0K | | |
| $R_{118}$ | −3032.9K | | |
| $R_{119}$ | −1702.0K | | |
| $R_{120}$ | −1333.5K | | |
| $R_{121}$ | −1224.8K | | |
| $R_{122}$ | open | | |

We claim:

1. A four-level digital filter system for data modems comprising means for converting the incoming data input into first and second parallel inputs, logic control means connected to said inputs for converting said inputs into a sign bit output and an amplitude bit output, first and second digital shaping filters connected to the said outputs for shaping each said output into the inverse Fourier transform of the time response of a substantially ideal low-pass filter, means for adding a bias term to the outputs of one of said digital shaping filters so as to produce a modified output, and summing means for summing said modified output with the output of the other of said digital filters to produce a four-level signal.

2. A system as claimed in claim 1 wherein said summing means comprises an operational amplifier having a first input connected to said modified output through a first resistor and a econd input connected to the output of said other digital filter through a second resistor having a value equal to twice that of said firstt resistor.

3. A system as claimed in claim 1 wherein said logic control means comprises means for directly connecting said first parallel input to the input of said first digital filter and an exclusive-Or gate having a first input connected to said first parallel input, a second input connected to said second parallel input and an output connected to said second digital filter.

4. A system as claimed in claim 1 wherein one of the digital filters produces a truncated sin$x/x$ waveform shaped in accordance with the window function $K_o$ and $K_1$ are constants and the function exists for the truncated period $t$=0 to 2T1.

5. A system as claimed in claim 4 wherein $K_o$ = 0.538 and $K_1$ = 0.462.

* * * * *